Patented June 24, 1930

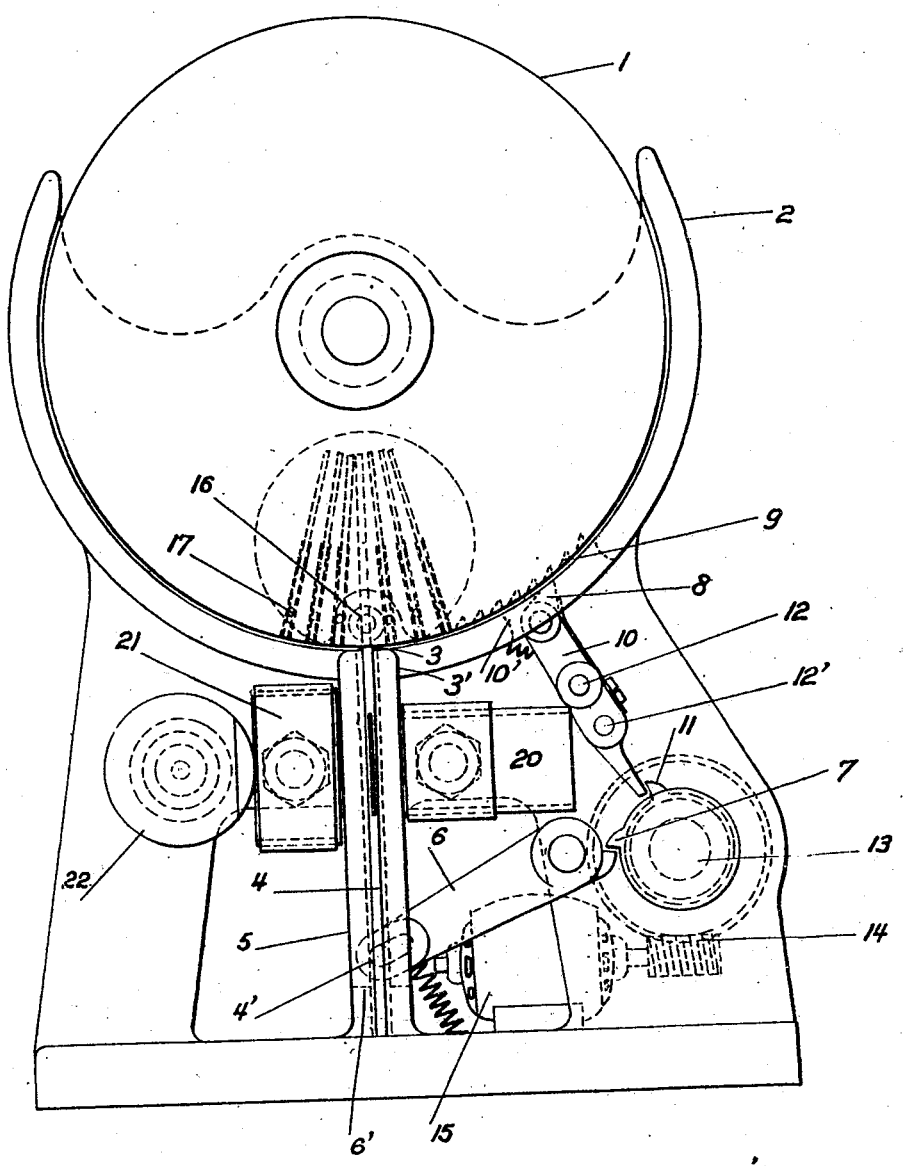

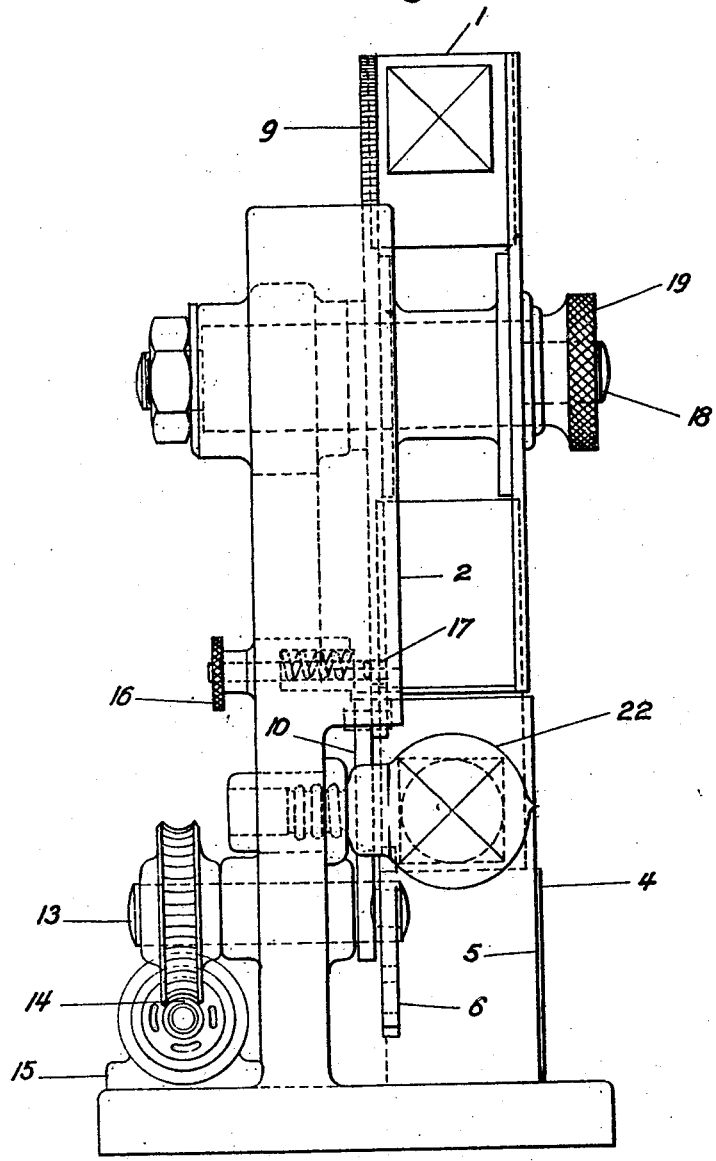

1,768,111

UNITED STATES PATENT OFFICE

MAURICE LOUIS BRANGER, OF PARIS, FRANCE

LUMINOUS PROJECTION APPARATUS

Application filed December 23, 1927, Serial No. 242,234, and in France March 26, 1927.

There are already known types of luminous projection apparatus (lanterns) suitable for all purposes, such as education, publicity, attractions, et cetera, comprising in combination with the so-called fixed system of projection, a rotary magazine having a vertical axis of rotation in which are placed the slides to be projected, the latter being automatically and in succession advanced into the required position for projection by being pushed in a direction perpendicular to the axis of rotation of the magazine in certain cases, and by being pushed in a direction parallel to the axis of rotation in other cases.

It is recognized that apparatus of this design have numerous drawbacks as a result of the principle of their construction and that their functioning is uncertain.

In the known forms of these apparatuses the slides are led to the required position for projection too slowly, and there is no obstruction of the light during the displacement of the slides. Moreover, the frames which are always constituted by several side members, involve difficulties to the access of the slides and prevent the detachability of the majority of the component elements and particularly of the magazine which it may be desirable to replace, as for instance, when a lantern lecture includes more slides than can be contained in this magazine.

With the object of avoiding the above drawbacks, this invention is a luminous projection apparatus of automatic or controlled function which permits of the light from the lantern being obstructed between the time of leaving of one slide and the arrival of the next slide, which time is of short duration. The apparatus is constituted by a single frame with a vertical side member on which are fitted the lantern, the condenser and the objective. Also on this side member are disposed certain bosses, one for each spindle of each of the moving members, which have a rotary or oscillating motion. This is for the purpose of rendering all the members perfectly accessible both for fitting and for adjustment. It further serves the purpose of making the magazine detachable as well as all the other component parts, as all the spindles or pivots have only a single bearing or housing, and furthermore it serves to produce an apparatus with a minimum number of constituent parts.

As the magazine is specially visible, the slide compartments can be numbered and the return to zero effected rapidly owing to the extreme accessibility of the pawl.

An embodiment of the manner in which this invention can be carried out is hereafter described with reference to the annexed drawing whereon similar numerals of reference denote corresponding parts throughout the several views.

Fig. 1 is a front elevation of the whole of the mechanism.

Fig. 2 is an end elevation of the whole of the mechanism.

These figures illustrate an apparatus wherein the weight of the slide is utilized in such a manner that it comes of itself into the correct position for projection. The circular magazine 1 has for this purpose its axis of rotation disposed horizontally so that it revolves above a concentric member 2 which serves to retain the slides placed below the horizontal so that they cannot be ejected from the magazine. On the extended vertical diameter of the magazine is a slit 3 which when opened enables the slide which is to be projected to pass therethrough.

The slide then takes up its position of rest, being controlled by the shutter 4 movable vertically in a guideway in a slide rail 5 and subject to the effect of the thrust given to it by an oscillating lever 6 which is set into operation at the required moment by a suitable form of cam 7.

At the precise moment when the slide is at the high point in the course of its return to its housing, the magazine then receives a rotary movement sufficient to permit of the projection either of the next following slide or of the second or third following slide.

This rotary movement of the magazine is obtained through the pawl 8 which co-acts with one of the circular walls 9 of the magazine, which walls are suitably provided with a toothed rack for this purpose, the pawl in question being fitted to one of the extremities of a lever 10, the other extremity being suitably formed to transmit the action of a cam 11 which causes the lever to turn either on its centre 12 or at a point 12' a fraction of its length, for the delivery of one slide after another or of alternate or every third slide.

Other pivotal bearings for the lever 10 can be provided for different fractions than those indicated in the drawing if required.

The two cams 7 and 11 are integral with a spindle 13 which is operated by a worm or helical gear 14 which can be controlled by an electric motor 15, or can be set in motion by hand, either in proximity or at a distance.

The closing of the slit 3, to permit of the rotation of the magazine without allowing the slide to fall into the slide rail 5, is ensured either by raising the shutter 4 or by a bolt suitably housed at 3'.

To fix the magazine 1 in a position suitable for the fall of a slide a spring-pressed plunger 16 is disposed in the side member, said plunger engaging in the holes 17 suitably formed in the wall 8 of the magazine.

The inner end of the spring-pressed plunger or pin 16 is slightly rounded (see dotted lines, Fig. 2) so that when the magazine is given a forward movement said pin will be forced outward from the hole 17 in which it may be located and will spring into the next hole in the magazine when said next hole arrives in position to register with said plunger or pin.

The backward movement of the levers 6 and 10 are limited by the abutments 6' and 10' respectively, these levers being returned to their position by springs.

For placing the magazine into position and for its removal, it should be encased in a cylinder which serves for its conveyance. For this purpose the side member has projecting from its head a screw-threaded pin 18 which receives the nut 19 to enable the placing in position of the magazine to be used. 20 is the objective, 21 the condenser and 22 the lamp.

The concentric member 2 of the slide rail 5 may be integral with the frame.

The shutter 4 for raising the slide has a pivot 4'. This arrangement is not necessary but can be modified by having an opening in which the extremity of the lever 6 can move. This extremity of the lever would then be simplified and would not require a pivot.

From the foregoing it will be understood that when a slide in the circular rotary magazine 1 is brought into register with the slide-receiving guideway in the slide rail 5 such slide will fall by gravity into said guideway when the shutter 4 is in the lowered position shown in Fig. 1. At such time the slide will be interposed between the objective 20 and the condenser 21. After exposure of the slide the lever 6 will be lifted to return the slide to cause the shutter 4 to return the slide to the magazine, and in its lifted position the shutter will be interposed between the members of the projecting device so as to shut off the light from the lamp 22.

It is obvious that for pivoting purposes the lever 10 must have only one pivot, either 12 or 12'.

The apparatus can also be used for taking double views such as stereoscopic slides or the like, in black or in colour, or can be adapted to other processes for projection capable of producing relief effects.

The elements of projection can also be modified and may give place to a lens or pair of lenses for looking at views, as in the case of stereoscopes at present in existence.

In these apparatuses it can easily be understood that the rotation of the magazine can take place automatically by the slide raising mechanism.

Having now described my invention, what I claim and desire to secure by Letters Patent is—

1. In a luminous projection apparatus, the combination with a circular slide-carrying rotary magazine having radial guide grooves for the slides and means for intermittingly rotating the said magazine, of projection devices and a slide-receiving guideway arranged below said magazine, said projecting devices including a lamp, a shutter disposed in said guideway and serving to lift the slides, and means for lifting said shutter after a slide, resting on said shutter, has been exposed, said shutter, when lifted, being interposed between the members of the projecting device, so as to shut off the light from said lamp, and said shutter, when lifted, returning the exposed slide to said magazine.

2. A luminous apparatus according to claim 1 in which the magazine rotating means comprises a lever and a cam for operating the same, and in which apparatus the shutter lifting means also comprises a lever and an operating cam therefor.

3. A luminous projecting apparatus according to claim 1 in which the magazine rotating means comprises a lever and means for varying the pivotal point of said lever to vary the rotary displacement of said magazine so as to bring any desired slide guide groove into register with the slide-receiving guideway below said magazine.

4. A luminous projecting apparatus according to claim 1 which comprises a magazine having a series of holes and a spring-pressed plunger or pin arranged to enter said holes and by means of which plunger or pin the magazine may be held against displacement.

In testimony whereof I affix my signature.

MAURICE LOUIS BRANGER.